United States Patent [19]

Aydin

[11] Patent Number: 5,077,683
[45] Date of Patent: Dec. 31, 1991

[54] EXPANSION SLOT ADAPTER WITH EMBEDDED DATA DEVICE INTERFACE

[75] Inventor: Alex Aydin, Newport Beach, Calif.

[73] Assignee: Procom Technology, Inc., Costa Mesa, Calif.

[21] Appl. No.: 462,751

[22] Filed: Jan. 10, 1990

[51] Int. Cl.⁵ ............................................. H05K 7/74
[52] U.S. Cl. .................................... 364/708; 361/415
[58] Field of Search ....................... 364/708; 361/415

[56] References Cited

U.S. PATENT DOCUMENTS

| | | | |
|---|---|---|---|
| 4,401,351 | 8/1983 | Record | 339/17 LM |
| 4,558,914 | 12/1985 | Prager et al. | 339/75 R |
| 4,573,753 | 3/1986 | Vogl | 339/17 LM |
| 4,641,262 | 2/1987 | Bryan et al. | 364/900 |
| 4,703,394 | 10/1987 | Petit et al. | 361/413 |
| 4,742,477 | 5/1988 | Phillips et al. | 364/708 |
| 4,744,006 | 5/1988 | Duffield | 361/413 |
| 4,745,524 | 5/1988 | Patton, III | 361/415 |
| 4,862,327 | 8/1989 | Ansell et al. | 361/415 |
| 4,862,400 | 8/1989 | Selbrede | 364/708 |
| 4,924,355 | 5/1990 | Mitchell et al. | 361/415 |

Primary Examiner—David H. Malzahn
Attorney, Agent, or Firm—Pretty, Schroeder, Brueggemann & Clark

[57] ABSTRACT

An expansion slot adapter is electrically connected to the data bus of the system board of a personal computer. The expansion slot adapter provides a circuit board having a plurality of expansion slots that may be used for connecting peripheral devices to the computer. The expansion slot adapter also includes a connector for a storage device and an on-board basic input/output system (BIOS) for direct connection of the storage device to the expansion slot adapter board without using one of the expansion slots.

8 Claims, 1 Drawing Sheet

EXPANSION SLOT ADAPTER WITH EMBEDDED DATA DEVICE INTERFACE

BACKGROUND OF THE INVENTION

1. Field of the Invention

This invention relates to personal computer systems, and more particularly to computer expansion slot adapters for providing additional connections to data devices.

2. Description of the Related Art

A typical personal computer is constructed with a system board that includes the various elements comprising the primary digital electronics necessary for the processing functions of the computer. The digital electronics are electrically connected to a common data bus on the system board. Data devices such as video monitors and data storage devices may also be connected to the computer data bus. The storage devices include hard disk drives, floppy disk drives, optical compact disc (CD-ROM) devices, and magnetic tape drives. Each data device typically includes a cable projecting from the device cabinet and a controller circuit board within the cabinet connected to the cable and provided with a multiple-pin connector. Several multiple-pin connector sockets, or expansion slots, are provided on the system board for connection with the device circuit board. A data device is connected to the data bus by mounting the circuit board in one of the expansion slots and connecting the device cable to the circuit board.

The system board expansion slots are electrically connected to the data bus. When a data device is connected to an expansion slot, data from the device is passed along the cable to the device circuit board, the data bus, the computer digital electronics, and other data devices. That is, when data is passed from one peripheral device to another, or to the digital electronics of the computer, the data is passed along the data bus.

Generally, one expansion slot is required for each data device. Some personal computers are provided with up to eight expansion slots. Other computers may have more limited expansion slot capabilities. For example, the IBM "PS/2" computer has only three.

Many users want to connect a large number of devices, such as additional monitors, storage devices, and the like. Other devices that are fast becoming popular, such as optical character readers, modems, and interfaces to other computer systems, also require expansion slots. All of these devices are competing for the fixed number of expansion slots on a personal computer. Thus, there is often a need for connecting a data storage device with a personal computer without decreasing the number of expansion slots available for other devices.

Each personal computer operates in accordance with a particular data interface standard. For example, the current interface standards that are in most widespread use are known as the ST-506, ESDI, SCSI, and AT interface standards. These standards prescribe the number of data lines to be used, the sequence and protocol for data transfers, timing requirements, interrupt signals, and other technical specifications for data transfer. The transfer of data between the computer and the devices is accomplished in accordance with the interface standard under the control of the basic input/output system (BIOS) of the computer. The BIOS allows the personal computer to communicate with the data device. The data storage device that will be connected to the personal computer must include a device controller having a BIOS that will be compatible with the BIOS of the personal computer. The device controller typically comprises a circuit board upon which digital electronic components are mounted. The circuit board includes electrical pin connectors that are inserted into one of the expansion slots of the system board. Thus, the device controller uses up another one of the expansion slots of the system board. There is a need, therefore, for a device controller that does not use up one of the expansion slots, leaving them free for other devices.

Another important feature of the personal computer is its ability to be part of a network of computers, or a local area network ("LAN") system. The computers in a network can share information and tasks. LAN systems include a network circuit board that is connected to an expansion slot on the computer system board, thus using up yet another one of the expansion slots. There is a need for a network interface for a LAN system package that provides compatibility with a LAN system but that does not require a LAN network board connected to an expansion slot of the computer.

SUMMARY OF THE INVENTION

The present invention provides a personal computer system board expansion slot adapter for connecting a data device to a personal computer, the adapter including a system board connection to a data device without using up one of the computer's expansion slots and including an embedded BIOS that is compatible with the BIOS and data interface standard of the computer. That is, even though the data device is connected to the personal computer, the same number of expansion slots are still available. Thus, the user gains the benefit of connection between the personal computer and a data device without decreasing the number of expansion slots available. There is no need for a separate device controller board, because the expansion slot adapter of the present invention includes a BIOS that is compatible with at least one of the more popular data interface standards. The novel expansion slot adapter also provides an interface to a local area network (LAN) system without the necessity of giving up an expansion slot for a network interface board.

In the preferred embodiment of the present invention, the adapter comprises a circuit board with system board connector tabs for interfacing the board with a system board expansion slot, a data device connector slot for interfacing the adapter with a data storage device, a plurality of expansion slots for connecting other peripheral devices to the adapter, and the digital electronics necessary to implement the data device controller and a BIOS for controlling and processing the transfer of data between the computer and the data device. That is, the present invention provides an expansion slot adapter having an embedded device controller. The circuit board also includes the digital electronics necessary for supporting a LAN system without a LAN system network board, thereby saving another one of the expansion slots for use by a peripheral device.

Other features and advantages of the present invention will be appreciated from the following description of the preferred embodiment, taken in conjunction with the accompanying drawings, which illustrate by way of example the principles of the invention.

DESCRIPTION OF THE PREFERRED EMBODIMENT

Figure 1:
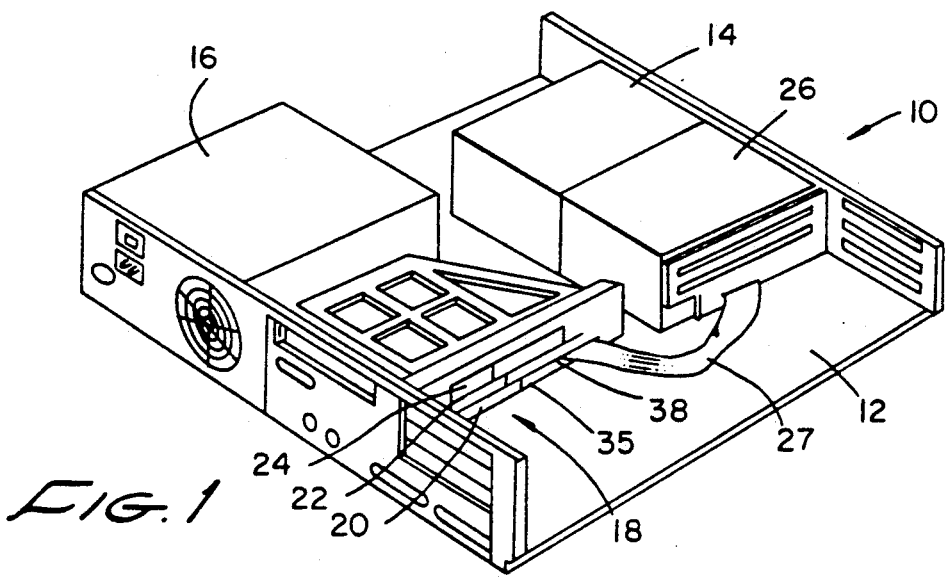
FIG. 1 is a perspective view of a personal computer with its cover removed, revealing the system board.

The following detailed description is of the best presently contemplated mode of carrying out the invention and is not to be taken in a limiting sense, but is made merely for the purpose of illustrating the general principles of the invention. The scope of the invention is best defined by the appended claims. Like reference numerals refer to like elements in the several drawings.

A personal computer 10, illustrated in FIG. 1, is an IBM PS/2, but it is to be understood that the present invention has applicability with many different personal computers. Mounted on the system board are the computer central processor unit 14, a power supply 16, and an expansion slot adapter 18 in accordance with the present invention. The electrical connections between the central processor and the adapter comprise the data bus of the personal computer. The expansion slot adapter includes three expansion slots 20, 22, 24 for connecting data devices to the computer, such as video monitors, disk drives, and modems.

In the exemplary IBM PS/2, a structure known as a riser arm is connected to the system board of the computer. The riser arm has no data processing functions; it simply facilitates the physical connection of data devices to the computer by providing a plurality of expansion slots connected to the data bus. The expansion slot adapter 18 of the present invention completely takes the place of the riser arm connected to the system board 12. Each of the expansion slots 20, 22, 24 in the adapter is electrically connected to the personal computer data bus. A disk drive data storage device 26 is also mounted on the system board. The data device is connected to the expansion slot adapter via a multi-wire flat cable 27 connected to a device tab connector slot 38 of the adapter. It is to be understood that a wide variety of data devices may be used, rather than a disk drive. As explained more fully below, a separate device controller board is not necessary as an intermediate connection between the personal computer and the data storage device.

Figure 2:
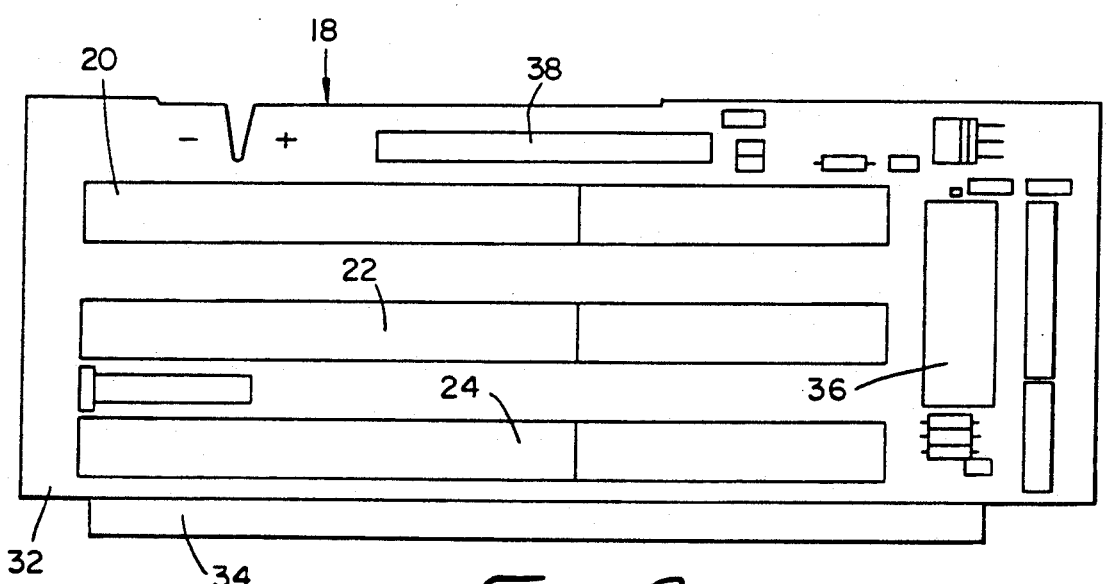
FIG. 2 is a perspective view of a preferred embodiment of the present invention.

An expansion slot adapter 18, constructed in accordance with the present invention and shown in FIG. 2, includes a circuit board 32 having integral multiple tab connectors 34 that are inserted into a connector slot 35 of the system board 12 of the personal computer 10. The connector slot would ordinarily receive the tab connectors of a riser arm (not shown). As noted, however, the adapter replaces the riser arm and therefore is connected to the slot in its place. The adapter's tab connectors serve to connect the expansion slot adapter to the computer data bus. The adapter also includes digital processing circuitry for performing the desired data interface functions. These functions include providing the Basic Input Output System (BIOS) necessary to support data exchange between the data storage device 26 and the other components connected to the computer data bus, providing the device controller function for supervising data transfer. Thus, the device 26 controller function is embedded in the adapter, and the data device may be directly connected to the computer 10 without a separate device controller board. Another data interface function performed by the adapter is that of providing an interface to a local area network (LAN) system. That is, the LAN interface is provided without a separate network board. In the embodiment illustrated, the data processing circuitry is provided in the form of integrated circuits 36 having the necessary computer instructions stored therein as non-volatile ROM data.

When the personal computer is turned on, the central processor 14 must be given information concerning the configuration of the system, including the type of data devices connected to the data bus. The integrated circuits 36 of the present invention and the data contained therein provide this information. A source code listing of the program containing the information is attached as Appendix A. This informs the computer that a data storage device is connected and supported, and that a LAN system is installed and supported, for example. The details of providing such information to the computer are well within the abilities of those skilled in the art. Some of the elements provided by the digital circuitry 36 of the present invention also include the data registers necessary for use by the device controller and the LAN system. These registers would ordinarily be provided on separate circuit boards comprising a device controller and network board, respectively. Thus, these circuit boards, which would otherwise take up expansion slots, are not necessary. Other registers may also be provided. The LAN system sold by Novell, for example, requires four additional registers. Ordinarily, these registers would be supplied on a Novell-provided network circuit board that would be inserted into one of the expansion slots 20, 22, or 24. These registers, however, are already provided on the circuit board 32 of the present invention, among those of the integrated circuits 36.

Another function that may be provided by the adapter 18 is that of operating system compatibility. For example, most personal computer systems make use of an operating system known as "MS-DOS" (disk operating system) by Microsoft Corporation. Other systems, such as the IBM PS/2, might use alternative systems, such as "OS/2" by IBM. Generally, these systems are not compatible. That is, programs and data files structured for use with one system data format will not be used with the other operating system. The adapter 18 of the present invention includes digital circuitry 36 that provides a conversion function for compatibility between systems such as MS-DOS and OS/2. The conversion routine itself is well within the abilities of those skilled in the art. Again, this obviates the need for a separate circuit board performing this function and taking up an expansion slot.

As noted, the adapter 18 also includes a connector slot 38 for connection to an associated data storage device, such as the hard disk drive 26. In the case of the IBM PS/2, for example, the adapter may be constructed as a direct replacement for the riser arm supplied by IBM that connects to the PS/2 system board. The IBM-supplied riser arm provides three expansion slots. Thus, the adapter of the present invention provides the same number of expansion slots as the standard IBM PS/2 expansion slot adapter, even though the adapter of the present invention also provides for direct connection to a disk drive storage device and the necessary disk controller and BIOS. The three expansion slots 20, 22, 24 are connected to the computer's data bus via the tab connectors 34.

Figure 3:
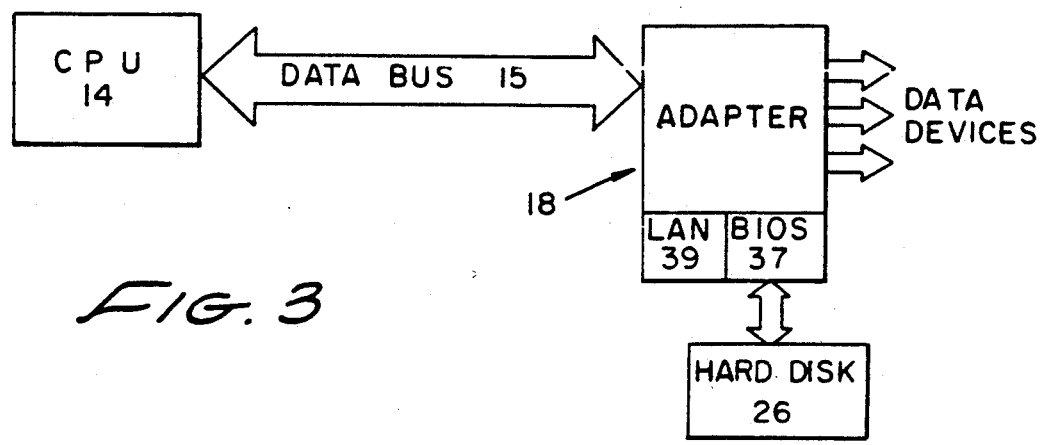
FIG. 3 is a block diagram of the present invention showing the relationship between the personal computer, the adapter, and the data storage device.

The relationship of the expansion slot adapter 18 of the present invention to the other computer system elements is best understood with reference to FIG. 3. The expansion slot adapter is connected to the computer processor unit 14 via the computer data bus 15. The expansion slot adapter is connected to the data bus and also directly to the hard disk data storage device 26. The adapter includes an on-board BIOS 37 in its data processing circuitry 36. That is, the adapter is connected directly to the hard disk through its embedded controller and not through one of the standard expansion slots, and therefore does not require a separate disk controller board. Therefore, the adapter does not use up an expansion slot in communicating with the hard disk. The three expansion slots 20, 22, and 24 allow three data devices to be connected to the data bus of the computer. Thus, there may actually be a net increase in the total number of data devices available to the user. As illustrated, the adapter may also incorporate a LAN interface 39 to support a LAN system that would otherwise require a separate LAN board.

The present invention has been described above in terms of a presently preferred embodiment so that an understanding of the present invention may be conveyed. There are, however, many configurations not specifically described herein, but with which the present invention is applicable. Such other configurations may be achieved by those skilled in the art in view of the description herein. The present invention therefore should not be seen as limited to the particular embodiment described herein, but rather, it should be understood that the present invention has wide applicability with respect to computers and slot connectors.

APPENDIX A

```
"------------------------------------------------------------
"JUMPERS DEFINITION
"
"       JP3 JP2             ROM ADDRESS SELECTION
"
"       OUT OUT             C800H
"       OUT IN              CA00H
"       IN  OUT             CC00H
"       IN  IN              CE00H
"
"------------------------------------------------------------
"       JP4                 PRIMARY/SECONDARY I/O SELECTION
"
"       OUT                 PRIMARY ADDRESS 1F0-1F7, 3F6-3F7
"       IN                  SECONDARY ADDRESS 170-177, 376-377
"
"------------------------------------------------------------
"       JP5                 LOGIC DISABLE
"
"       OUT                 ENABLE ENTIRE ROM/IMBEDDED HARD DISK LOGIC
"       IN                  DISABLE LOGIC
"
"------------------------------------------------------------

PIRA                device 'P20L8';

" inputs

RESET       PIN  1;    " SYSTEM RESET
        AEN         PIN  2;    " ADDRESS ENABLE
        A3          PIN  3;    " SYSTEM ADDRESS 3
        UPDEC1_     PIN  4;    " SYSTEM ADDRESS 4,5 HI (/)
        UPDEC2_     PIN  5;    " SYSTEM ADDRESS 1,2 HI (/)
        UPDEC_      PIN  6;    " SYSTEM ADDRESS 15,18,19 HI (/)
        A7          PIN  7;    " SYSTEM ADDRESS 7
        A8          PIN  8;    " SYSTEM ADDRESS 8
        A9          PIN  9;    " SYSTEM ADDRESS 9
        A13         PIN 10;    " SYSTEM ADDRESS 13
        A14         PIN 11;    " SYSTEM ADDRESS 14
        A16         PIN 13;    " SYSTEM ADDRESS 16
        A17         PIN 14;    " SYSTEM ADDRESS 17
        PRISEL      PIN 16;    " PRIMARY/SECONDARY SELECT
        SMEMRD      PIN 17;    " SYSTEM MEMORY READ (/)
```

```
          DIS_         PIN  21;    " LOGIC DISABLE (/)
          ROMSEL0      PIN  23;    " ROM ADDRESS SELECT 0
          ROMSEL1      PIN  20;    " ROM ADDRESS SELECT 1

" OUTPUTS

RESET_       PIN  15;    " SYSTEM RESET (/)
          CS1_         PIN  18;    " CHIP SELECT 1 (/)
          CS0_         PIN  19;    " CHIP SELECT 0 (/)
          ROMEN_       PIN  22;    " ROM ENABLE (/)

" EQUATIONS

!RESET_  =  RESET;

!CS0_    = ( !A3 & !A7 &  A8 & !A9 & !AEN & DIS_ & !PRISEL
                            !UPDEC1_
                     #  !A3 &  A7 & !A8 & !A9 & !AEN & DIS_
                     &  PRISEL & !UPDEC1_ );

!CS1_    = ( !A3 & !A7 &  A8 &  A9 & !AEN & DIS_ & !PRISEL &
                            !UPDEC1_ & !UPDEC2_
                     #  !A3 &  A7 & !A8 &  A9 & !AEN & DIS_ &  PRISEL &
                            !UPDEC1_ & !UPDEC2_ );

!ROMEN_  = ( !A13 & !A14 & !A16 & !A17 & !AEN & DIS_ & ROMSEL0
                            &  ROMSEL1 & !SMEMRD_ & !UPDEC_
                     # !A13 &  A14 & !A16 & !A17 & !AEN & DIS_
                            &  ROMSEL0 & !ROMSEL1 & !SMEMRD_
                            & !UPDEC_
                     #  A13 & !A14 & !A16 & !A17 & !AEN & DIS_
                            &  ROMSEL0 &  ROMSEL1 & !SMEMRD_
                            & !UPDEC_
                     #  A13 &  A14 & !A16 & !A17 & !AEN & DIS_
                            &  ROMSEL0 &  ROMSEL1 & !SMEMRD_
                            & !UPDEC_ );

END
```

I claim:

1. A computer expansion slot adapter that is adapted to connect a first data device to the computer and is adapted to connect a plurality of other data devices with the computer, the expansion slot adapter comprising:
  an adapter circuit board;
  a data device slot connector mounted on the adapter circuit board for directly connecting the first data device to the adapter;
  a plurality of expansion slot connectors mounted on the adapter circuit board and adapted to connect the adapter circuit board with the plurality of other data devices;
  a multiple-tab connector mounted on the adapter circuit board and adapted to connect the adapter circuit board with the computer; and
  controller means, mounted on the adapter circuit board and operatively connected to the computer and the data device slot connector, for providing a data transfer interface between the computer and the first data device.

2. An expansion slot adapter as recited in claim 1, wherein the adapter further includes:
  interface means, mounted on the adapter circuit board and operatively connected to the multiple-tab connector, for performing the functions of a local area network system board.

3. An expansion slot adapter as recited in claim 2, wherein the interface means comprises a digital logic integrated circuit mounted on the adapter circuit board.

4. An expansion slot adapter as recited in claim 1, wherein the controller means includes digital logic circuitry providing a basic input/output system (BIOS) for the first data device.

5. An expansion slot adapter as recited in claim 4, wherein the controller means includes operating system transfer means for providing a data transfer interface that allows the transfer of data between a first data format used by one of the data devices and a second, different data format used by the computer.

6. An expansion slot adapter for receiving tab contacts of printed circuit boards associated with data devices and connecting the data devices with a computer that operates in accordance with a data format standard, the expansion slot adapter comprising:
- a circuit board having at least three expansion slot connectors that can receive the tab contacts of the data device printed circuit boards, thereby connecting the data devices to the expansion slot adapter;
- an integral multiple-tab connector mounted on the circuit board for connecting the expansion slot adapter with the computer;
- a data device expansion slot connector mounted on the circuit board for connecting a first data device to the expansion slot adapter;
- controller means, mounted on the circuit board, for providing a data transfer interface between the computer data format standard and the data format standard of the first data device; and
- network interface means, mounted on the circuit board and operatively connected to the integral multiple-tab connector, for performing the functions necessary to support a local area network system.

7. An expansion slot adapter as recited in claim 6, wherein the first data device comprises a hard disk drive.

8. An expansion slot adapter as recited in claim 6, wherein the controller means comprises a digital logic integrated circuit mounted on the circuit board.

* * * * *